US006992614B1

(12) United States Patent
Joyce

(10) Patent No.: US 6,992,614 B1
(45) Date of Patent: Jan. 31, 2006

(54) RADAR ALTIMETER

(75) Inventor: James W. Joyce, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 10/829,849

(22) Filed: Apr. 22, 2004

(51) Int. Cl.
*G01S 13/32* (2006.01)

(52) U.S. Cl. ....................................... 342/122; 342/120

(58) Field of Classification Search ................ 342/120, 342/121, 122, 123
See application file for complete search history.

(56) References Cited

U.S. PATENT DOCUMENTS

| | | | | |
|---|---|---|---|---|
| 4,427,981 A * | 1/1984 | Kyriakos | 342/122 |
| 4,509,049 A | 4/1985 | Haendel et al. | |
| 4,599,618 A * | 7/1986 | Haendel et al. | 342/122 |
| 4,733,239 A * | 3/1988 | Schmitt | 342/122 |
| 4,947,354 A * | 8/1990 | Hethuin | 342/122 |
| 4,958,161 A * | 9/1990 | Allezard | 342/122 |
| 5,115,247 A * | 5/1992 | Thue | 342/132 |
| 5,252,981 A | 10/1993 | Grein et al. | |
| 5,477,226 A | 12/1995 | Hager et al. | |
| 5,719,582 A | 2/1998 | Gray | |
| 5,781,148 A | 7/1998 | Severwright | |
| 5,898,401 A | 4/1999 | Walls | |
| 6,008,754 A | 12/1999 | Roos | |
| 6,072,426 A | 6/2000 | Roos | |
| 6,130,636 A | 10/2000 | Severwright | |
| 6,362,776 B1 | 3/2002 | Hager et al. | |
| 6,426,717 B1 * | 7/2002 | Maloratsky | 342/122 |
| 6,462,703 B2 | 10/2002 | Hedrick | |

OTHER PUBLICATIONS

Skolnik, Merrill I, Radar Handbook, pp. 16-28 to 16-32.
Technical Standard Order TSO-C87, Airborne Low-Range Radio Altimeter; pp. 1-41, Feb. 1, 1966, http://www.airweb.faa.gov/Regulatory_and_Guidance_Library/rgTSO.nsf/0/2C417369F3ACFDD886256DC70062A5C1?OpenDocument.
RTCA D0-155, Minimum Performance Standards Airborne Low-Range Altimeter, Nov. 1, 1974.

* cited by examiner

*Primary Examiner*—Ian J. Lobo

(57) ABSTRACT

A radar altimeter is provided that includes a transmitter operable to generate a radio signal at a modulation frequency, and transmit the radio signal toward a ground surface for reflection therefrom to thereby propagate a reflected radio signal. The radar altimeter also includes a receiver operable to receive the reflected radio signal, and determine the altitude of the aircraft based on the modulation frequency of the radio signal and a difference frequency derived from the radio signal and the reflected radio signal. The receiver is also operable to control the transmitter so as to vary the modulation frequency of the radio signal based on the altitude of the aircraft. Preferably, the modulation frequency of the radio signal is greater at lower altitudes than at higher altitudes.

27 Claims, 2 Drawing Sheets

FIG.—1

RADAR ALTIMETER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to radar altimeters, and more particularly to frequency modulated continuous wave (FMCW) radar altimeters used for aviation navigation.

2. Description of Related Art

Frequency modulated continuous wave (FMCW) radar altimeters are used by pilots to determine the altitude of an aircraft in flight-critical situations, such as making an instrument landing in low visibility conditions. A FMCW radar altimeter generally comprises a transmitter that transmits a radio signal toward the ground surface, and a receiver that receives the radio signal after it has reflected from the ground surface. The receiver mixes the transmitted radio signal with the received reflected radio signal and thereby generates a difference signal. The receiver uses the frequency of this difference signal to determine the altitude of the aircraft (wherein the frequency is proportional to the altitude). This altitude measurement is then output to a radar altimeter display located within the cockpit of the aircraft.

One inherent problem with the design of a FMCW radar altimeter is that there will be a certain amount of coupling from the transmitter antenna to the receiver antenna. This antenna coupling is particularly problematic at higher altitudes where the magnitude of the antenna coupling signal is significant compared to the magnitude of the received reflected radio signal. As such, the receiver will occasionally lock on to the antenna coupling signal, and then erroneously use the frequency of the antenna coupling signal to determine the altitude of the aircraft. When this happens, the needle of the radar altimeter display drops to approximately 0 feet, resulting in undue pilot concern or even the loss of the pilot's confidence in the radar altimeter.

An attempt to solve this problem has been to utilize a switched filter in the receiver of a FMCW radar altimeter for the purpose of attenuating the antenna coupling signal at higher altitudes. The switched filter is designed to have one frequency response at lower altitudes (which passes both the difference signal and the antenna coupling signal) and another frequency response at higher altitudes (which passes the difference signal and attenuates the antenna coupling signal). Thus, in operation, the receiver will properly lock on to the difference signal both at lower altitudes (where the magnitude of the difference signal is relatively large compared to the magnitude of the antenna coupling signal) and at higher altitudes (where the antenna coupling signal has been attenuated).

There are several disadvantages, however, associated with the use of a switched filter within the receiver of a FMCW radar altimeter. For example, because the characteristics of a switched filter are fixed, various hardware components of the receiver must be changed in order to modify the filter parameters. As such, the switched filter may not be customized on an individual installation basis. Thus, there is a need for a FMCW radar altimeter that does not use a switched filter to attenuate the antenna coupling signal.

SUMMARY OF THE INVENTION

The present invention is directed to a FMCW radar altimeter that generally comprises a transmitter and a receiver. The transmitter is operable to generate a radio signal at a specified modulation frequency, and transmit the radio signal toward the ground surface for reflection therefrom to thereby propagate a reflected radio signal. The receiver is operable to receive the reflected radio signal from the ground surface, and determine the altitude of the aircraft based on two different factors: (1) the modulation frequency of the radio signal; and (2) a difference frequency derived from the radio signal and the reflected radio signal. The receiver is also operable to control the transmitter so as to vary the modulation frequency of the radio signal based on the altitude of the aircraft. Preferably, the modulation frequency of the radio signal is greater at lower altitudes than at higher altitudes.

In an exemplary embodiment, the transmitter includes a variable rate modulator that generates a voltage waveform. The transmitter also includes a voltage controlled oscillator that generates a radio signal at a specified modulation frequency, which is controlled by the voltage waveform from the variable rate modulator. Also included is a transmitter antenna that transmits the radio signal toward the ground surface for reflection therefrom to thereby propagate a reflected radio signal.

The receiver includes a receiver antenna that receives the reflected radio signal from the ground surface, and also detects an unwanted antenna coupling signal from the transmitter antenna. A mixer is provided that mixes the radio signal, the reflected radio signal, and the unwanted antenna coupling signal and thereby generates a mixed signal. The mixer then demodulates the mixed signal into a baseband difference signal (having a difference frequency derived from the radio signal and the reflected radio signal) and a baseband antenna coupling signal. The receiver also includes a fixed filter designed to attenuate the baseband antenna coupling signal and pass the baseband difference signal. Significantly, the fixed filter has a single frequency response for all altitudes of the aircraft such that a switched filter is not required.

The receiver further includes an analog-to-digital converter that converts the baseband difference signal to a digital difference signal. A digital signal processor is also provided that determines the difference frequency from the digital difference signal, and then correlates the difference frequency to the altitude of the aircraft for the particular modulation frequency of the radio signal. The receiver also includes a microprocessor that controls the variable rate modulator of the transmitter so as to vary the modulation frequency of the radio signal based on the altitude of the aircraft. Preferably, the modulation frequency of the radio signal is varied when the altitude of the aircraft reaches one or more threshold altitudes, such that the modulation frequency is greater at altitudes below a particular threshold altitude than at altitudes above the particular threshold altitude. By varying the modulation frequency of the radio signal, the receiver is able to obtain more accurate altitude measurements when the aircraft is near the ground surface.

The present invention will be better understood from the following detailed description of the invention, read in connection with the drawings as hereinafter described.

DETAILED DESCRIPTION OF THE INVENTION

Figure 1:
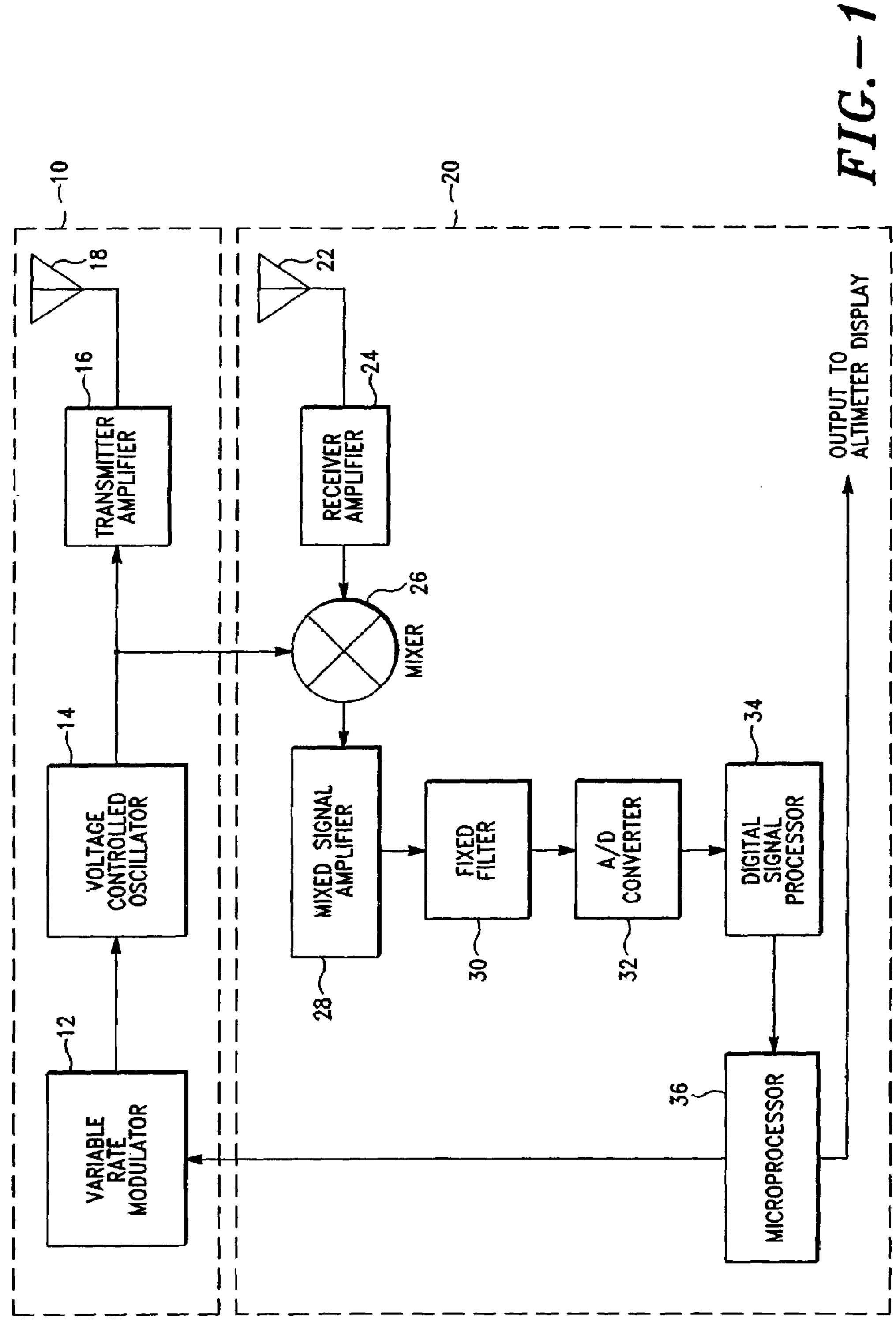
FIG. 1 is a block diagram of a radar altimeter in accordance with an exemplary embodiment of the present invention, showing the various functional blocks of the transmitter and the receiver.

A frequency modulated continuous wave (FMCW) radar altimeter in accordance with an exemplary embodiment of the present invention is depicted in FIG. 1 (with graphical representations of the functionality of the radar altimeter depicted in FIGS. 2–5). While the invention will be described in detail hereinbelow with reference to this exemplary embodiment, it should be understood that the invention is not limited to the specific architecture of the radar altimeter shown in this embodiment. Rather, one skilled in the art will appreciate that a wide variety of radar altimeter architectures may be implemented in accordance with the present invention.

Referring to FIG. 1, a radar altimeter in accordance with an exemplary embodiment of the present invention includes a transmitter 10 (which generally comprises a variable rate modulator 12, a voltage controlled oscillator 14, a transmitter amplifier 16, and a transmitter antenna 18) and a receiver 20 (which generally comprises a receiver antenna 22, a receiver amplifier 24, a mixer 26, a mixed signal amplifier 28, a fixed filter 30, an analog-to-digital converter 32, a digital signal processor 34, and a microprocessor 36). Preferably, the radar altimeter is designed to comply with various aviation industry specifications known in the art, such as TSO C87, RTCA DO-178B and RTCA DO-160D.

As will be described in greater detail hereinbelow, transmitter 10 is operable to generate a radio signal at a specified modulation frequency, and transmit the radio signal toward the ground surface for reflection therefrom to thereby propagate a reflected radio signal. Receiver 20 is operable to receive the reflected radio signal from the ground surface, and determine the altitude of the aircraft based on two different factors: (1) the modulation frequency of the radio signal; and (2) a difference frequency derived from the radio signal and the reflected radio signal. Receiver 20 is also operable to control transmitter 10 so as to vary the modulation frequency of the radio signal based on the altitude of the aircraft, wherein the modulation frequency is greater at lower altitudes than at higher altitudes. As will be seen, by varying the modulation frequency of the radio signal based on the altitude of the aircraft, receiver 20 is able to utilize fixed filter 30 which has a single frequency response for all altitudes of the aircraft. In addition, receiver 20 is able to obtain more accurate altitude measurements when the aircraft is near the ground surface.

Looking more closely to transmitter 10 in FIG. 1, variable rate modulator 12 generally operates as a driver circuit for voltage controlled oscillator 14. In particular, variable rate modulator 12 generates a voltage waveform that causes voltage controlled oscillator 14 to frequency modulate and thereby generate a FMCW radio signal. As such, the voltage waveform generated by variable rate modulator 12 controls the modulation frequency of the radio signal. As will be described in greater detail hereinbelow, microprocessor 36 of receiver 20 controls variable rate modulator 12 so as to change the voltage waveform generated by variable rate modulator 12 when the altitude of the aircraft reaches one or more predetermined threshold altitudes, thereby changing the modulation frequency of the radio signal.

Voltage controlled oscillator 14 is operable to receive the voltage waveform from variable rate modulator 12 and frequency modulate an RF waveform of constant amplitude to generate a FMCW radio signal. Typically, the center frequency of the FMCW radio signal is set to 4.3 GHz, although any center frequency may be used. The period of modulation may vary from 0.01 μs (corresponding to a modulation frequency of 100 Hz) to 0.0095 μs (corresponding to a modulation frequency of 105 Hz), although any period of modulation and corresponding modulation frequency may be used. Preferably, the radio signal is modulated such that the frequency increases and decreases linearly as it varies in time. As is known in the art, the slope of the radio signal is the frequency deviation rate and is typically expressed in hertz per foot (Hz/ft) of altitude. As will be described in greater detail hereinbelow, digital signal processor 34 of receiver 20 is able to use the modulation frequency and corresponding frequency deviation rate (in conjunction with a difference frequency described below) to provide an accurate measurement of the altitude of the aircraft above the ground surface.

Transmitter amplifier 16 is operable to receive the radio signal from voltage controlled oscillator 14 and increase the amplitude of the radio signal before it is transmitted through transmitter antenna 18. Preferably, the output power of transmitter amplifier 16 is sufficient to ensure that the radio signal may be detected by receiver antenna 22 after reflection from the ground surface, which is particularly critical at higher altitudes of the aircraft. Thus, transmitter 10 may be "matched" to receiver 20 such that a transmitter having a lower output power may be used in connection with a receiver having better detection capabilities, and vice-versa. A typical output power for transmitter amplifier 16 is 160 mW.

Transmitter antenna 18 is operable to receive the radio signal from transmitter amplifier 16 and transmit the radio signal toward the ground surface. It should be understood that the radio signal then reflects off the ground surface to thereby propagate a reflected radio signal. Receiver antenna 22 is then operable to detect and receive the reflected radio signal propagated from the ground surface.

As is known in the art, transmitter antenna 18 and receiver antenna 22 are preferably mounted at least 20 inches apart near the point of aircraft rotation and as close as feasible to the receiver/transmitter box. It is also preferable to mount both antennas such that they are not located near other antennas or aircraft projections (including landing gear, flaps, etc.). Preferably, both antennas are mounted such that they point straight downward (e.g., within 6 degrees) when the aircraft is in level flight.

Because transmitter antenna 18 and receiver antenna 22 are both located on the same aircraft, it is known in the art that an unwanted antenna coupling signal will be generated from transmitter antenna 18 to receiver antenna 22. As such, receiver antenna 22 will detect and receive both the reflected radio signal and the unwanted antenna coupling signal. As will be described below, the unwanted antenna coupling signal is attenuated by fixed filter 30 in accordance with the present invention.

Receiver amplifier 24 is operable to receive the reflected radio signal from receiver antenna 22 and increase the amplitude of the reflected radio signal so that it may be easily processed by subsequent circuitry within receiver 20. Preferably, the output power of receiver amplifier 24 is great enough to meet the input requirements of mixer 26, even at higher altitudes where the power of the reflected radio signal is weaker. Of course, receiver amplifier 24 will also increase the amplitude of the unwanted antenna coupling signal received from receiver antenna 22.

Mixer 26 is operable to receive the reflected radio signal and the unwanted antenna coupling signal from receiver amplifier 24, and is also connected to transmitter 10 so as to receive the radio signal from voltage controlled oscillator 14 prior to transmission. Preferably, mixer 26 receives the radio signal being transmitted at a specified time and the reflected radio being received at that same specified time. Mixer 26 is then operable to mix the radio signal with the reflected radio signal and the unwanted antenna coupling signal, and then demodulate these signals so as to generate a baseband difference signal and a baseband antenna coupling signal. The frequency of the baseband difference signal (hereinafter referred to as the "difference frequency") is derived from the difference between the frequencies of the transmitted radio signal and the received reflected radio signal. One skilled in the art will understand that the difference frequency is proportional to the altitude of the aircraft, and ranges from $f_{min}$ (corresponding to the altitude of the aircraft on the ground surface) to $f_{max}$ (corresponding to the altitude of the aircraft at the maximum of the altimatic scale, commonly 2,500 feet above the ground surface).

Figure 2:
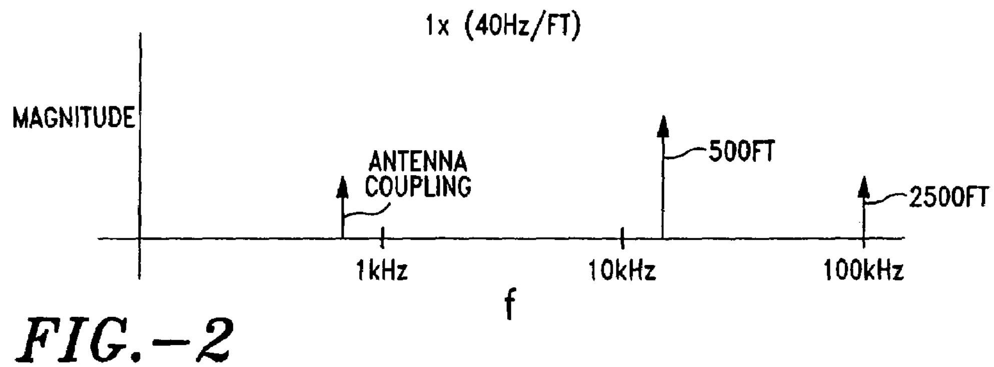
FIG. 2 is a graphical representation of the output of the mixer of the receiver shown in FIG. 1, wherein the radio signal has been modulated at the nominal modulation frequency.
Figure 3:
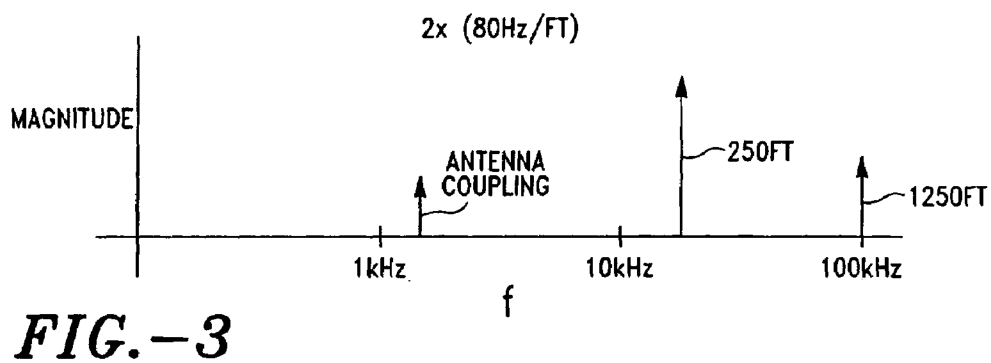
FIG. 3 is a graphical representation of the output of the mixer of the receiver shown in FIG. 1, wherein the radio signal has been modulated at twice the nominal modulation frequency.
Figure 4:
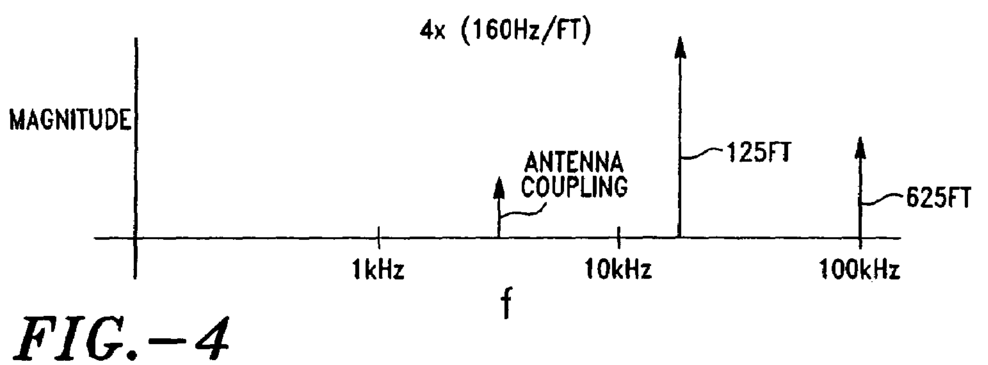
FIG. 4 is a graphical representation of the output of the mixer of the receiver shown in FIG. 1, wherein the radio signal has been modulated at four times the nominal modulation frequency.

FIGS. 2–4 are graphical representations of the output of mixer 26, wherein the radio signal has been modulated at three different modulation frequencies, namely, a nominal modulation frequency (1×) of 100 Hz (see FIG. 2), twice the nominal modulation frequency (2×) of 200 Hz (see FIG. 3), and four times the nominal modulation frequency (4×) of 400 Hz (see FIG. 4). Each of these graphical representations show the approximate frequencies and magnitudes of the baseband antenna coupling signal and the baseband difference signal for various altitudes of the aircraft. It should be understood that the magnitudes of the various signals are not to scale and are intended only to show the relative strength between the signals. Similarly, the frequencies of the various signals are approximated and are intended only to show the relative frequencies between the signals. It should further be understood that the modulation frequencies shown in the graphical representations of FIGS. 2–4 are merely examples and that a plurality of other modulation frequencies could be used in accordance with the present invention (e.g., 1.5 times the nominal modulation frequency, 5 times the nominal modulation frequency, etc.).

In FIG. 2, the radio signal has been modulated at a nominal modulation frequency (1×) of 100 Hz, which corresponds to a frequency deviation rate of 40 Hz/ft. As can be seen, the frequency of the baseband antenna coupling signal is approximately 800 Hz. It should be understood that the exact frequency of the baseband antenna coupling signal may vary from installation to installation and is dependent on a number of variables, including antenna spacing and the length of the antenna cables. It can also be seen that the frequency of the baseband difference signal is approximately 20 kHz at an altitude of 500 feet and approximately 100 kHz at an altitude of 2,500 feet. Furthermore, it can be seen that the magnitude of the baseband antenna coupling signal is significantly less than the magnitude of the baseband difference signal at an altitude of 500 feet, and is also less than the magnitude of the baseband difference signal at an altitude of 2,500 feet.

In FIG. 3, the radio signal has been modulated at twice the nominal modulation frequency (2×) of 200 Hz, which corresponds to a frequency deviation rate of 80 Hz/ft. As can be seen, the frequency of the baseband antenna coupling signal is approximately 1.6 kHz. Again, it should be understood that the exact frequency of the baseband antenna coupling signal may vary from installation to installation and is dependent on a number of variables, including antenna spacing and the length of the antenna cables. It can also be seen that the frequency of the baseband difference signal is approximately 20 kHz at an altitude of 250 feet and approximately 100 kHz at an altitude of 1,250 feet. Furthermore, it can be seen that the magnitude of the baseband antenna coupling signal is significantly less than the magnitude of the baseband difference signal at an altitude of 250 feet, and is also less than the magnitude of the baseband difference signal at an altitude of 1,250 feet.

In FIG. 4, the radio signal has been modulated at four times the nominal modulation frequency (4×) of 400 Hz, which corresponds to a frequency deviation rate of 160 Hz/ft. As can be seen, the frequency of the baseband antenna coupling signal is approximately 3.2 kHz. Yet again, it should be understood that the exact frequency of the baseband antenna coupling signal may vary from installation to installation and is dependent on a number of variables, including antenna spacing and the length of the antenna cables. It can also be seen that the frequency of the baseband difference signal is approximately 20 kHz at an altitude of 125 feet and approximately 100 kHz at an altitude of 625 feet. Furthermore, it can be seen that the magnitude of the baseband antenna coupling signal is significantly less than the magnitude of the baseband difference signal at an altitude of 125 feet, and is also less than the magnitude of the baseband difference signal at an altitude of 625 feet.

Several observations can be made from the graphical representations of FIGS. 2–4. First, for any of the modulation frequencies, the frequency of the baseband difference signal is proportional to the altitude of the aircraft (i.e., the frequency increases as the altitude increases) and the magnitude of the baseband difference signal is inversely proportional to the altitude of the aircraft (i.e., the magnitude decreases as the altitude increases). Second, the frequency of the baseband difference signal is proportional to the modulation frequency of the radio signal (i.e., the frequency increases as the modulation frequency increases).

Third, the baseband difference signal will have approximately the same frequency for different combinations of altitude and modulation frequency. For example, the difference frequency is 20 kHz for: an aircraft flying at 500 feet with a modulation frequency of 100 Hz (see FIG. 2); an aircraft flying at 250 feet with a modulation frequency of 200 Hz (see FIG. 3); and an aircraft flying at 125 feet with a modulation frequency of 400 Hz (see FIG. 4). Similarly, the difference frequency is 100 kHz for: an aircraft flying at 2,500 feet with a modulation frequency of 100 Hz (see FIG. 2); an aircraft flying at 1,250 feet with a modulation frequency of 200 Hz (see FIG. 3); and an aircraft flying at 625 feet with a modulation frequency of 400 Hz (see FIG. 4).

As will be described in greater detail hereinbelow, the modulation frequency of the radio signal may be varied when the aircraft reaches one or more predetermined threshold altitudes. In general, the modulation frequency of the radio signal is greater at lower altitudes than at higher altitudes. Using a greater modulation frequency at lower altitudes causes the difference frequency of the baseband difference signal to be increased and shifted away from the frequency of the baseband antenna coupling signal. For example, looking to FIG. 4, it can be appreciated that an aircraft flying at 500 feet with a radio signal generated at four times the nominal modulation frequency (4×) of 400 Hz will produce a baseband difference signal having a difference frequency of approximately 80 kHz (as opposed to 20 kHz if the radio signal had been generated at the nominal modulation frequency (1×) of 100 Hz, as shown in FIG. 2). It will be seen that varying the modulation frequency at one or more predetermined threshold altitudes enables the use of fixed filter 30 (described below) for all altitudes of the aircraft such that a switched filter is not required.

Referring again to FIG. 1, mixed signal amplifier 28 is operable to receive the baseband difference signal from mixer 26 and increase the amplitude of the baseband difference signal. Preferably, the output power of mixed signal amplifier 28 is sufficient to ensure that the baseband difference signal may be easily processed by downstream circuits within receiver 20. Of course, mixed signal amplifier 28 will also increase the amplitude of the unwanted baseband antenna coupling signal received from mixer 26.

Figure 5:
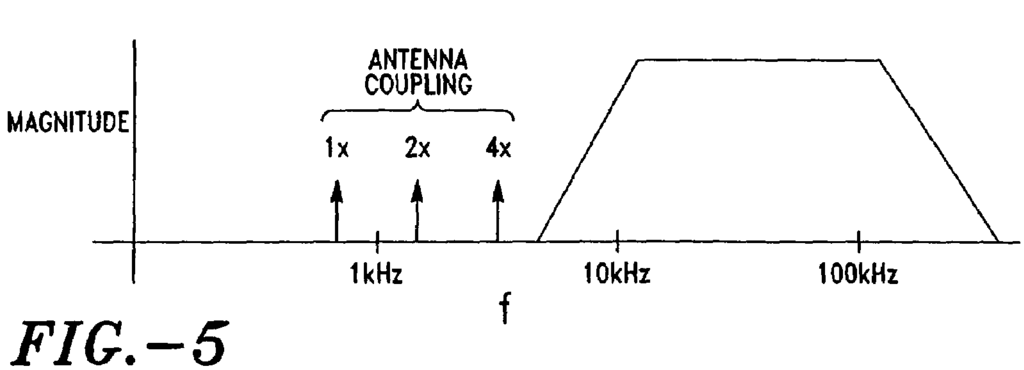
FIG. 5 is a graphical representation of the frequency response of the fixed filter of the receiver shown in FIG. 1, showing attenuation of the baseband antenna coupling signal when the radio signal has been modulated at the nominal modulation frequency, twice the nominal modulation frequency, and four times the nominal modulation frequency.

Fixed filter 30 is operable to receive the baseband difference signal and the baseband antenna coupling signal from mixed signal amplifier 28, and filter the unwanted baseband antenna coupling signal therefrom. A graphical representation of an exemplary frequency response of fixed filter 30 is shown in FIG. 5. In this example, fixed filter 30 comprises a band-pass filter that is tuned to pass signals within the 10 kHz to 100 kHz frequency range without attenuation. It can also be seen that the band-pass filter will pass the signals between 4-kHz and 10 kHz (with varying degrees of attenuation) and the signals between 100 kHz and 300 kHz (with varying degrees of attenuation). In addition, the band-pass filter will significantly attenuate all signals below 4 kHz and above 300 kHz. As such, in this example, the band-pass filter will pass any of the baseband difference signals shown in FIGS. 2–4 (all of which fall within the 10 kHz to 100 kHz frequency range) and attenuate any of the baseband antenna coupling signals shown in FIGS. 2–4 (all of which fall below 4 kHz).

Looking at FIGS. 2–4 in conjunction with FIG. 5, it can be seen that increasing the modulation frequency of the radio signal at lower altitudes causes the baseband difference signals to increase in frequency and shift within the passband of fixed filter 30. It should be understood that if the modulation frequency of the radio signal was not increased at lower altitudes, the baseband difference signals would fall below the passband of fixed filter 30 and would thus be attenuated (such that it would be necessary to use a switched filter having one frequency response at lower altitudes and another frequency response at higher altitudes). Thus, in accordance with the present invention, varying the modulation frequency of the radio signal at one or more predetermined threshold altitudes enables the use of fixed filter 30 having the same frequency response for all altitudes of the aircraft.

Referring again to FIG. 1, analog-to-digital converter 32 is operable to receive the baseband difference signal from fixed filter 30 and convert the baseband difference signal to a digital difference signal. Preferably, the sampling rate, resolution and spurious-free dynamic range of analog-to-digital converter 32 is selected to ensure that the converted signals comply with aviation industry specifications. Of course, it should be understood that any analog-to-digital converter that meets the conversion requirements for a particular application may be used.

Digital signal processor 34 is operable to receive the digital difference signal from analog-to-digital converter 32 and determine the difference frequency therefrom (which, as discussed above, is derived from the difference between the frequencies of the transmitted radio signal and the received reflected radio signal). Digital signal processor 34 is then operable to correlate the difference frequency to the altitude of the aircraft for the particular modulation frequency of the radio signal. In other words, digital signal processor 34 determines the altitude of the aircraft based on two different factors: (1) the modulation frequency of the radio signal; and (2) the difference frequency extracted from the digital difference signal.

For example, looking to FIG. 2, a radio signal modulated at the nominal modulation frequency (1×) of 100 Hz has a corresponding frequency deviation rate of 40 Hz/ft. At this modulation frequency, if the difference frequency extracted from the digital difference signal were 20 kHz, it follows that the altitude of the aircraft is 500 feet (i.e., 20 kHz divided by 40 Hz/ft).

As another example, looking to FIG. 3, a radio signal modulated at twice the nominal modulation frequency (2×) of 200 Hz has a corresponding frequency deviation rate of 80 Hz/ft. At this modulation frequency, if the difference frequency extracted from the digital difference signal were 20 kHz, it follows that the altitude of the aircraft is 250 feet (i.e., 20 kHz divided by 80 Hz/ft).

As yet another example, looking to FIG. 4, a radio signal modulated at four times the nominal modulation frequency (4×) of 400 Hz has a corresponding frequency deviation rate of 160 Hz/ft. At this modulation frequency, if the difference frequency extracted from the digital difference signal were 20 kHz, it follows that the altitude of the aircraft is 125 feet (i.e., 20 kHz divided by 160 Hz/ft).

In all three examples, it should be noted that the difference frequency extracted from the digital difference signal is 20 kHz. Thus, it is necessary to know both the difference frequency and the modulation frequency and corresponding frequency deviation rate of the radio signal in order to determine the altitude of the aircraft.

Referring yet again to FIG. 1, microprocessor 36 is operable to receive the altitude measurement from digital signal processor 34 and generate an output signal that is transmitted to the radar altimeter display located within the cockpit of the aircraft. Microprocessor 36 is also operable to control variable rate modulator 12 of transmitter 10 so as to vary the modulation frequency of the radio signal based on the altitude of the aircraft. Preferably, the modulation frequency of the radio signal is varied when the altitude of the aircraft reaches one or more predetermined threshold altitudes, such that the modulation frequency is greater at altitudes below a particular threshold altitude than at altitudes above the particular threshold altitude. Microprocessor 36 also transmits the modulation frequency to digital signal processor 34 for use in determining the altitude of the aircraft (described above). Of course, it should be understood that all of the various functions of microprocessor 36 could be incorporated into digital signal processor 34.

An example will now be provided in which the modulation frequency of the radio signal is varied at two predetermined threshold altitudes in accordance with the present invention. Looking to FIGS. 2–4, the predetermined threshold altitudes may comprise 1,000 feet and 500 feet. In this example, when the aircraft is flying above 1,000 feet, the radio signal would be generated at the nominal modulation frequency (1×) of 100 Hz. When the aircraft drops below the first threshold altitude of 1,000 feet, the radio signal would be generated at twice the nominal modulation frequency (2×) of 200 Hz. Then, when the aircraft drops below the second threshold altitude of 500 feet, the radio signal would be generated at four times the nominal modulation frequency (4×) of 400 Hz. Of course, it should be understood that any number of predetermined threshold altitudes may be utilized in accordance with the present invention.

It can be appreciated that increasing the modulation frequency of the radio signal at lower altitudes enables the radar altimeter to obtain more accurate altitude measurements when the aircraft is near the ground surface. Specifically, when using a higher modulation frequency, a given change in altitude results in a larger change in difference frequency. For example, in FIG. 4, a change in altitude of 500 feet (e.g., 125 feet to 625 feet) would result in a change in difference frequency of 80 kHz (e.g., 20 kHz to 100 kHz). By contrast, in FIG. 3, a change in altitude of 500 feet (e.g., 250 feet to 750 feet) would result in a change in difference frequency of 40 kHz (e.g., 20 kHz to 60 kHz). Thus, at higher modulation frequencies, the increased resolution results in more accurate altitude measurements for lower altitudes of the aircraft.

While the present invention has been described and illustrated hereinabove with reference to an exemplary embodiment, it should be understood that various modifications could be made to this embodiment without departing from the scope of the invention. Therefore, the invention is not to be limited to the specific embodiment described and illustrated hereinabove, except insofar as such limitations are included in the following claims.

What is claimed and desired to be secured by Letters Patent is as follows:

1. A radar altimeter for determining an altitude of an aircraft, comprising:
- a first antenna;
- a second antenna;
- a transmitter coupled to said first antenna and operable to generate a radio signal at a modulation frequency and transmit said radio signal, via said first antenna, toward a ground surface for reflection therefrom to thereby propagate a reflected radio signal; and
- a receiver coupled to said second antenna and configured to receive, via said second antenna, said reflected radio signal and an antenna coupling signal generated between said first and said second antenna, the receiver operable to (i) determine said altitude of said aircraft based on said modulation frequency of said radio signal and a difference frequency derived from said radio signal and said reflected radio signal and (ii) control said transmitter so as to vary said modulation frequency of said radio signal based on said altitude of said aircraft, said receiver comprising:
  - a mixer operable to (i) mix said radio signal with said reflected radio signal and said antenna coupling signal to thereby generate a mixed signal and (ii) demodulate said mixed signal into a baseband difference signal and a baseband antenna coupling signal, and
  - a filter operable to attenuate said baseband antenna coupling signal and pass said baseband difference signal without attenuation.

2. The radar altimeter of claim 1, wherein said radio signal comprises a frequency modulated continuous wave radio signal.

3. The radar altimeter of claim 1, wherein said altitude of said aircraft is determined based on said difference frequency derived from said radio signal being transmitted at a specified time and said reflected radio signal being received at said specified time.

4. The radar altimeter of claim 1, wherein said modulation frequency of said radio signal is varied when said altitude of said aircraft reaches at least one threshold altitude.

5. The radar altimeter of claim 4, wherein said modulation frequency of said radio signal is greater at altitudes below said threshold altitude than at altitudes above said threshold altitude.

6. The radar altimeter of claim 1, wherein said transmitter comprises:
- a variable rate modulator operable to generate a voltage waveform; and
- a voltage controlled oscillator operable to generate said radio signal at said modulation frequency, wherein said modulation frequency is controlled by said voltage waveform from said variable rate modulator.

7. The radar altimeter of claim 6, wherein said receiver comprises a microprocessor operable to control said variable rate modulator so as to vary said modulation frequency of said radio signal based on said altitude of said aircraft.

8. The radar altimeter of claim 1, wherein said filter comprises a fixed filter having a single frequency response for all altitudes of said aircraft.

9. The radar altimeter of claim 1, wherein said receiver further comprises:
- an analog-to-digital converter operable to convert said baseband difference signal to a digital difference signal;
- a digital signal processor operable to determine said difference frequency from said digital difference signal and correlate said difference frequency to said altitude of said aircraft for said modulation frequency; and
- a microprocessor operable to control said transmitter so as to vary said modulation frequency of said radio signal based on said altitude of said aircraft.

10. The radar altimeter of claim 9, wherein said microprocessor is also operable to output said altitude of said aircraft to a display of said altimeter.

11. A method of determining an altitude of an aircraft, comprising:
- generating a radio signal at a modulation frequency;
- transmitting said radio signal toward a ground surface for reflection therefrom to thereby propagate a reflected radio signal;
- receiving said reflected radio signal and, upon receipt thereof, generating an antenna coupling signal;
- mixing said radio signal with said reflected radio signal and said antenna coupling signal to thereby generate a mixed signal;
- demodulating said mixed signal into a baseband difference signal and a baseband antenna coupling signal;
- attenuating said baseband antenna coupling signal and passing said baseband difference signal without attenuation;

determining said altitude of said aircraft based on said modulation frequency of said radio signal and a difference frequency derived from said radio signal and said reflected radio signal;

and varying said modulation frequency of said radio signal based on said altitude of said aircraft.

12. The method of claim 11, wherein said altitude of said aircraft is determined based on said difference frequency derived from said radio signal being transmitted at a specified time and said reflected radio signal being received at said specified time.

13. The method of claim 11, wherein said modulation frequency of said radio signal is varied when said altitude of said aircraft reaches at least one threshold altitude.

14. The method of claim 13, wherein said modulation frequency of said radio signal is greater at altitudes below said threshold altitude than at altitudes above said threshold altitude.

15. The method of claim 11, further comprising:

generating a voltage waveform to control said modulation frequency of said radio signal;

generating said radio signal at said modulation frequency controlled by said voltage waveform; and varying said voltage waveform based on said altitude of said aircraft so as to vary said modulation fluency of said radio signal.

16. The method of claim 11, wherein said attenuating is performed by a fixed filter having a single frequency response for all altitudes of said aircraft.

17. The method of claim 11, wherein said method further comprises:

converting said baseband difference signal to a digital difference signal;

determining said difference frequency from said digital difference signal;

correlating said difference frequency to said altitude of said aircraft for said modulation frequency; and varying said modulation frequency based on said altitude of said aircraft.

18. A radar altimeter for determining an altitude of an aircraft, comprising:

means for generating a radio signal at a modulation frequency;

means for transmitting said radio signal toward a ground surface for reflection therefrom to thereby propagate a reflected radio signal;

means for receiving said reflected radio signal and an antenna coupling signal;

means for (i) mixing said radio signal with said reflected radio signal and said antenna coupling signal to thereby generate a mixed signal and (ii) demodulating said mixed signal into a baseband difference signal and a baseband antenna coupling signal, means for (i) attenuating said baseband antenna coupling signal and (ii) passing said baseband difference signal without attenuation;

means for determining said altitude of said aircraft based on said modulation frequency of said radio signal and a difference frequency derived from said radio signal and said reflected radio signal; and means for varying said modulation frequency of said radio signal based on said altitude of said aircraft.

19. The radar altimeter of claim 18, wherein said radio signal comprises a frequency modulated continuous wave radio signal.

20. The radar altimeter of claim 18, wherein said altitude of said aircraft is determined based on said difference frequency derived from said radio signal being transmitted at a specified time and said reflected radio signal being received at said specified time.

21. The radar altimeter of claim 18, wherein said modulation frequency of said radio signal is varied when said altitude of said aircraft reaches at least one threshold altitude.

22. The radar altimeter of claim 21, wherein said modulation frequency of said radio signal is greater at altitudes below said threshold altitude than at altitudes above said threshold altitude.

23. A radar altimeter for determining an altitude of an aircraft, comprising:

a variable rate modulator operable to generate a voltage waveform;

a voltage controlled oscillator operable to generate a frequency modulated continuous wave radio signal at a modulation frequency controlled by said voltage waveform from said variable rate modulator;

a transmitter antenna operable to transmit said radio signal toward a ground surface for reflection therefrom to thereby propagate a reflected radio signal;

a receiver antenna operable to receive said reflected radio signal, wherein said receiver antenna also receives an antenna coupling signal generated between said transmitter antenna and said receiver antenna;

a mixer operable to mix said radio signal with said reflected radio signal and said antenna coupling signal to thereby generate a mixed signal, said mixer also operable to demodulate said mixed signal into a baseband difference signal and a baseband antenna coupling signal;

a filter operable to attenuate said baseband antenna coupling signal and pass said baseband difference signal without attenuation;

an analog-to-digital converter operable to convert said baseband difference signal to a digital difference signal;

a digital signal processor operable to determine a difference frequency from said digital difference signal and correlate said difference frequency to said altitude of said aircraft for said modulation frequency; and a microprocessor operable to control said variable rate modulator so as to vary said modulation frequency of said radio signal based on said altitude of said aircraft.

24. The radar altimeter of claim 23, wherein said altitude of said aircraft is determined based on said difference frequency derived from said radio signal being transmitted at a specified time and said reflected radio signal being received at said specified time.

25. The radar altimeter of claim 23, wherein said modulation frequency of said radio signal is varied when said altitude of said aircraft reaches at least one threshold altitude.

26. The altimeter of claim 25, wherein said modulation frequency of said radio signal is greater at altitudes below said threshold altitude than at altitudes above said threshold altitude.

27. The radar altimeter of claim 23, wherein said filter comprises a fixed filter having a single frequency response for all altitudes of said aircraft.

* * * * *

UNITED STATES PATENT AND TRADEMARK OFFICE

CERTIFICATE OF CORRECTION

PATENT NO. : 6,992,614 B1
APPLICATION NO. : 10/829849
DATED : January 31, 2006
INVENTOR(S) : James W. Joyce It is certified that error appears in the above-identified patent and that said Letters Patent is hereby corrected as shown below:

In Column 12, line 58, following "The", insert --radar--

Signed and Sealed this

Twenty-seventh Day of March, 2007

JON W. DUDAS
*Director of the United States Patent and Trademark Office*